Feb. 26, 1957  E. V. BERGSTROM  2,783,099
GAS SOLID SEPARATION IN A PNEUMATIC LIFT
Filed Dec. 19, 1955  5 Sheets-Sheet 1

INVENTOR
*Eric V. Bergstrom*
BY
*Charles A. Huggett*
ATTORNEY

Feb. 26, 1957 E. V. BERGSTROM 2,783,099
GAS SOLID SEPARATION IN A PNEUMATIC LIFT
Filed Dec. 19, 1955 5 Sheets-Sheet 2

INVENTOR
Eric V. Bergstrom
BY
Charles A. Huggett
ATTORNEY

Feb. 26, 1957 E. V. BERGSTROM 2,783,099
GAS SOLID SEPARATION IN A PNEUMATIC LIFT
Filed Dec. 19, 1955 5 Sheets-Sheet 3
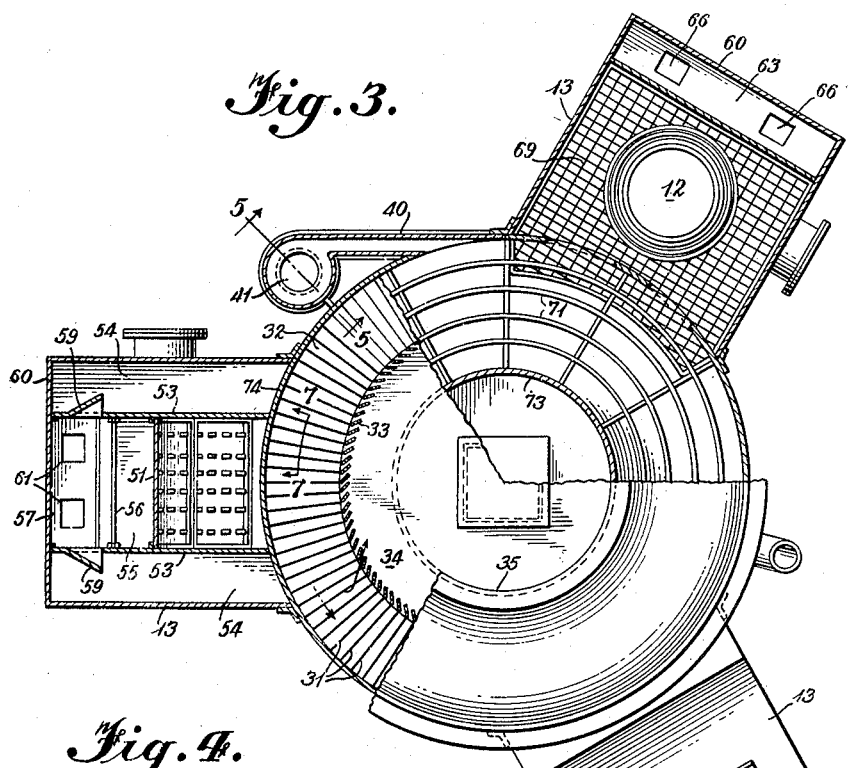
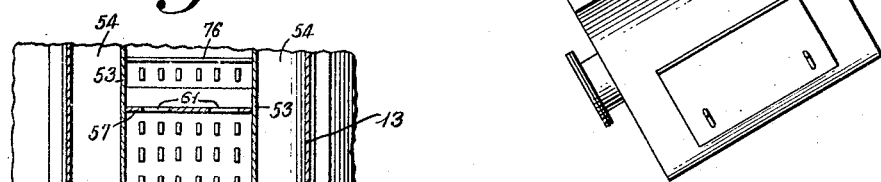
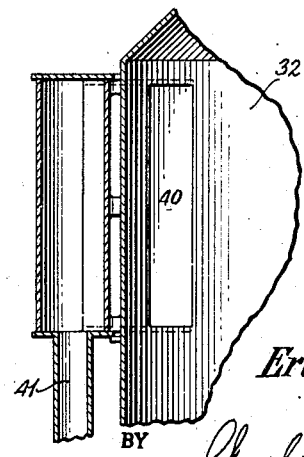
INVENTOR
Eric V. Bergstrom
BY Charles A. Huggett
ATTORNEY INVENTOR
*Eric V. Bergstrom*
BY *Charles A. Huggett*
ATTORNEY

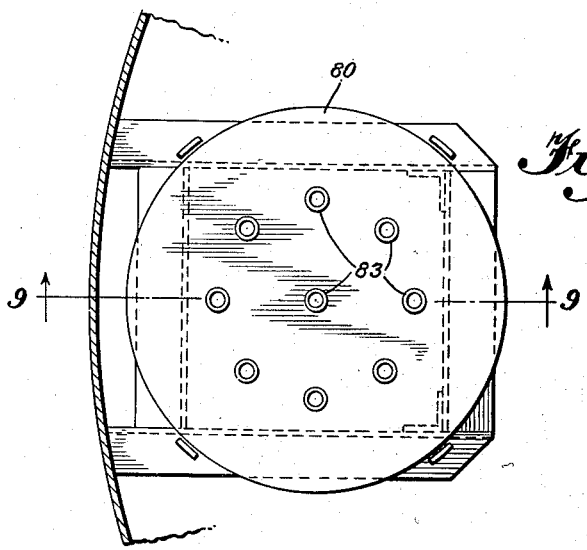
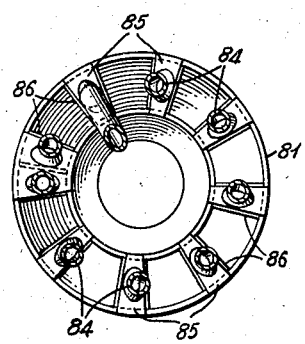
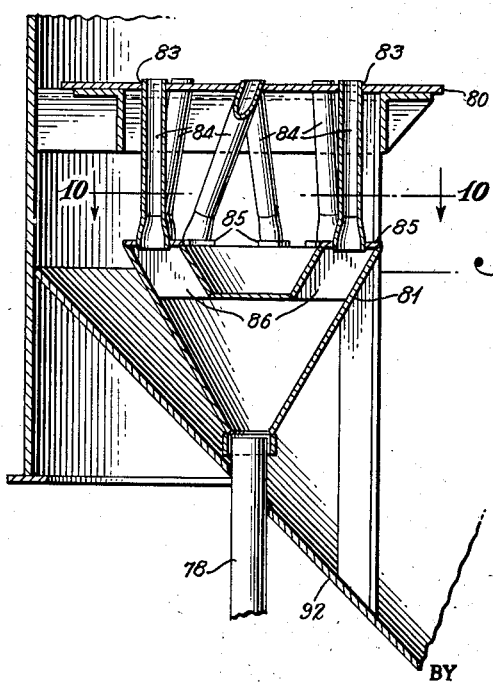

United States Patent Office 2,783,099
Patented Feb. 26, 1957

2,783,099

GAS SOLID SEPARATION IN A PNEUMATIC LIFT

Eric V. Bergstrom, Short Hills, N. J., assignor to Socony Mobil Oil Company, Inc., a corporation of New York Application December 19, 1955, Serial No. 554,002

3 Claims. (Cl. 302—59)

This invention pertains to an improved thermafor catalytic unit which is adapted to efficiently handle heavy and dirty stock. It is particularly concerned with pneumatic lifts used to raise granular solid particles in a continuous moving bed hydrocarbon conversion process and to separation of the solid particles from the lift gas at the top of the lift.

Various processes are known in the petroleum art which utilize a hot granular contact material as catalyst or heat-carrying medium to effect continuous conversion of hydrocarbons. The solid material is passed in the form of a compacted bed through reaction and reconditioning zones and lifted from the bottom of one bed to the top of the other to complete a continuous enclosed cyclic system. Typical processes are hydrogenation, desulfurization, coking, reforming and cracking. The reactant is passed through the voids in the bed of solids in the reaction zone and the reaction products are removed continuously from the other side of the bed. During conversion, a carbonaceous deposit usually forms on the surface of the contact material to a greater or lesser extent, depending upon the particular process. This carbonaceous deposit is removed by burning in the reconditioning zone.

The contact material may be natural or treated clays, such as bauxite, montmorillonite or kaolin or synthetics such as hydrogels of alumina, silica, chromia or combinations thereof. The granular material may be catalytic or absolutely or substantially inert. The inerts may be formed of corhart, mullite, coke or Carborundum. Various size ranges have been found suitable for the different processes, which may vary broadly from about 3–100 mesh Tyler. For example, in catalytic cracking, the range of particle size may suitably be from about 4–10 mesh Tyler. It is preferred that the particles be of uniform shape, such as pellets, pills, capsules or spheres and of about the same size. This provides uniform voids in the bed, providing low pressure drop across the bed of solids with the gas being distributed uniformly through the bed.

Recent moving bed conversion processes utilize dilute phase pneumatic lifts to effect continuous elevation of the contact catalyst. The particles are blown through an upwardly-directed lift pipe in a stream of rapidly-moving lift gas from a level beneath one of the contacting zones to a level above the other contacting zones. The particles are conveyed upwardly through the lift pipe as a suspension in a stream of rapidly-moving lift gas. The gas in dilute phase lifts is separated from the particles in a separating zone at the top of the lift passage, and the separated particles are gravitated downwardly from the separating zone as a compact column into the contacting zone.

A method of reducing the breakage and attrition of contact material by diverting the contact material as it leaves the lift pipe laterally out of the vertical projection of the pipe; and catching the catalyst as it is diverted at some level above the top of the pipe; and then gently lowering that catalyst which is caught, downwardly to the bed level maintained about the top of the lift pipe; is described and claimed in the co-pending application of Eric V. Bergstrom and Robert D. Drew, Serial No. 306,386 filed August 26, 1952.

The problem of separating the contact material from the gas stream at the top of the lift pipe is related to the diameter of the lift pipe. The particles issue from the top of the lift pipe in the form of a fountain. In order to insure that all of the particles clear the top of the lift pipe, the particles are discharged from the top at a fairly substantial upward velocity. When employing a lift pipe of large diameter it becomes increasingly difficult to separate the contact material from the lift gas and avoid fall-back into the lift pipe and collision with emerging particles. Thus it has been found impractical to increase the top diameter of the lift pipe beyond 40 inches, as the increased fall-back results in excessive attrition. No design of catalyst separator was known which would operate efficiently with a lift pipe larger than 40" in diameter. As a result, thermafor catalytic cracking units erected heretofore have been limited to catalyst circulation rates of 400 to 475 tons per hour; the maximum amount of catalyst that can be elevated in a 40" lift pipe.

It is an object of this invention to provide an apparatus and method of lifting a granular contact material at rates exceeding 750 tons per hour, in a lift gas and separating the gas and solids in a separating zone at the top of the lift passage with minimum attrition.

It is a further object of this invention to provide an apparatus and method for effectively handling a low grade dirty stock containing an excessive amount of carbon.

It is a further object of this invention to provide an apparatus and method of increasing the production rate of gasoline and fuel oil in the catalytic cracking of hydrocarbon stock.

It is a further object of this invention to provide in a thermafor catalytic cracking apparatus having divertor plates for the separation of catalyst and lift gas, an improved arrangement whereby the divertor plates are readily accessible for rapid repairs.

These and other objects will be disclosed in the following detailed description of the invention and the attached drawings showing the apparatus involved.

Fig. 3 shows a horizontal view of the apparatus of Figure 2 as seen on plane 3—3 of Figure 2.

Fig. 4 is a vertical section of the catalyst catcher and let-down plates of Figure 2 as seen on plane 4—4 of Figure 2.

Fig. 5 is a vertical section of the shave-off duct as seen on plane 5—5 of Figure 3.

Fig. 8 is a horizontal view of the withdrawal stool of Figure 2 as seen on plane 8—8 of Figure 2.

Fig. 9 is a vertical section of a withdrawal stool as seen on plane 9—9 of Figure 8.

Fig. 10 is a horizontal section of a withdrawal stool as seen on plane 10—10 of Figure 9.

The invention, in one of its broader aspects, involves pneumatic transfer of a particle-form solid contact material through a plurality of lift passages circumferentially spaced with respect to a common surge bin. Individual deflectors are provided at the top of each lift passage to deflect the particles issuing therefrom to a surface of the material maintained at a substantial elevation above the upper end of the lift passage. The deflected contact material gravitates downwardly and falls gently onto the surface of a second bed of the material maintained at a lower level beneath the top of the lift passage. A single central discharge is provided for the transfer of contact material to the reaction zone; and the lift gases are freed of fines in a common separator.

Figure 1:
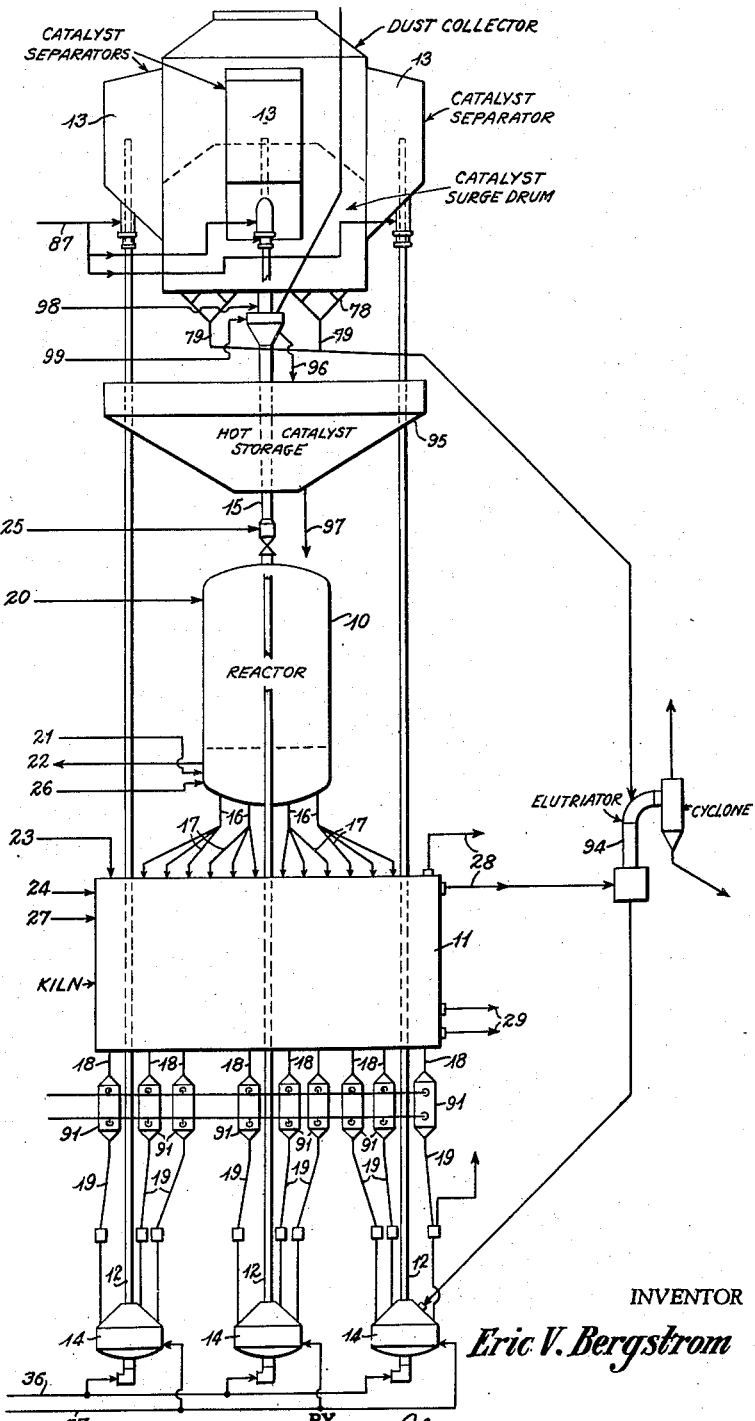
Fig. 1 is a diagrammatic showing of a complete moving bed conversion system which incorporates a plurality of pneumatic lifts.

The invention will now be disclosed as it applies to a catalytic cracking system, with reference first to the diagrammatic showing of the complete moving bed system shown on Figure 1. A superposed reactor 10 and kiln 11 is shown with three pneumatic lift pipes 12 located at the circumference of these vessels and separated by 120° of arc. Individual separators 13 are located about the top of the pipes and lift feed tanks 14 are located about the bottom of the pipes. A feed leg 15 is located between the separator and the reactor, conduits 16 and 17 are loacted between the reactor and kiln, and a plurality of conduits 18, 19 are located between the kiln and the three lift feed tanks. A continuous unobstructed path is formed thereby from the separator down through the reactor and kiln to the lift feed tank.

The catalyst storage bin 95 is provided for the temporary storage of hot catalyst during repair periods. In the event of a breakdown in the system, the catalyst may be diverted to storage through dump line 96 and is later returned to the system by fill line 97.

In operation, a bed surface of contact material is maintained about the upper end of the lift pipes in the lower portion of the separators 13 and particles flow continuously from the bottom of the separators toward the center of the surge drum 92 from which the catalyst is withdrawn through the elongated feed leg 15 in substantially compact form. The gas pressure in the reactor 10 is usually advanced and hence the feed leg 15 is made long enough to insure that the particles feed smoothly into the reactor vessel against the advanced pressure. The pressure may be about 5–30 p. s. i. (gauge). The solid contact material is passed downwardly through the reaction vessel in the form of a compact bed and is continuously removed from the bottom of the vessel via the conduits 16 and 17 in substantially compact columnar form. The hydrocarbon feed is introduced into the vessel 10 through the conduit 20. The reactants pass downwardly through the voids in the bed and the converted products are withdrawn from the bottom of the bed via the conduit 22. A small amount of seal gas passes through conduit 25 to the seal leg 15 and thereby confines the reactants to the reaction zone. A suitable purge gas is introduced into the bottom of the vessel 10 via the conduit 26 to strip the catalyst of vaporizable hydrocarbons in the bottom of the reaction zone, and an additional amount of purge gas is introduced at a level below the hydrocarbon discharge through conduit 21. The temperature in the reactor is usually about 800–1000° F. Seal gas and vent gas may be introduced into the upper section of leg 15 through conduits 98 and 99.

The spent catalyst is introduced into the top of the kiln 11 via the multiplicity of conduits 17, which are uniformly distributed about the top of the regeneration vessel 11. The contact material is gravitated downwardly through the kiln, and air is introduced via the conduits 27 and 23. Carbonaceous contaminant on the surface of the catalyst is burned therefrom and the flue gas is removed from the top and bottom of the bed via the conduits 28, 29. The kiln is generally operated at or near atmospheric pressure, and at a temperature of about 1000–1300° F. Excessive temperatures may heat damage the catalyst and hence emergency steam may be introduced into the kiln via the conduit 23 and withdrawn therefrom via the conduits 28 and 29.

The regenerated contact material is gravitated downwardly from the bottom of the kiln as a compact column through the conduits 18, into a plurality of external heat exchangers 91 which cool the catalyst to about 1000° F. These heat exchangers are described in my co-pending application Serial Number 481,802 filed January 14, 1955. Conduits 19 transfer the catalyst from the heat exchangers into the top of the lift feed tanks 14. The catalyst forms a compact bed of solids about the lower end of the three lift pipes 12. A primary gas pipe 36 is projected upwardly into the bottom of each tank 14 and is terminated just below the lift pipe.

The major portion of the lift gas is introduced into the three lift pipes via this pipe 36 without passing through the bed of solids in the tanks 14. A minor portion of the lift gas is introduced into each of the lift tanks 14 via the conduit 37 at locations laterally displaced from the lift pipe, so that this gas must pass through a substantial thickness of the bed of solids before it enters the lower end of the lift pipe. This minor portion of the gas, denominated secondary gas, pushes the contact material into the primary stream, and mingles with the primary gas to effect the upward transfer of the particles. It has been found that for best results the particles must be accelerated rapidly to a suitably high velocity in the lower portion of the lift and that the particle velocity must be reduced in the upper portion of the lift. The gas velocity in the lift is lowered by using a lift pipe having a gradually increasing cross-section from bottom to top. Each of the three lift pipes is tapered so that the particles are discharged from the top within the desired velocity range. It has also been discovered that in order to avoid surging in the upper portion of the lift and provide efficient discharge of the particles from the top of the lift, the average particle velocity as it issues from the top of the pipe should be broadly about 5–35 feet per second and preferably about 10–25 feet per second. The gas issuing from the top of the lift pipes expands in the separators 13 because of the increased cross-section of those units, thereby materially reducing the lifting force on the particles. However, the granular particles issuing from the top of the pipe possess appreciable momentum, and the particles are large enough and dense enough to resist following the laterally-moving gas. Therefore, the particles proceed directly upward in each separator for an appreciable distance until the upward velocity of the particles is reduced to zero.

Figure 2:
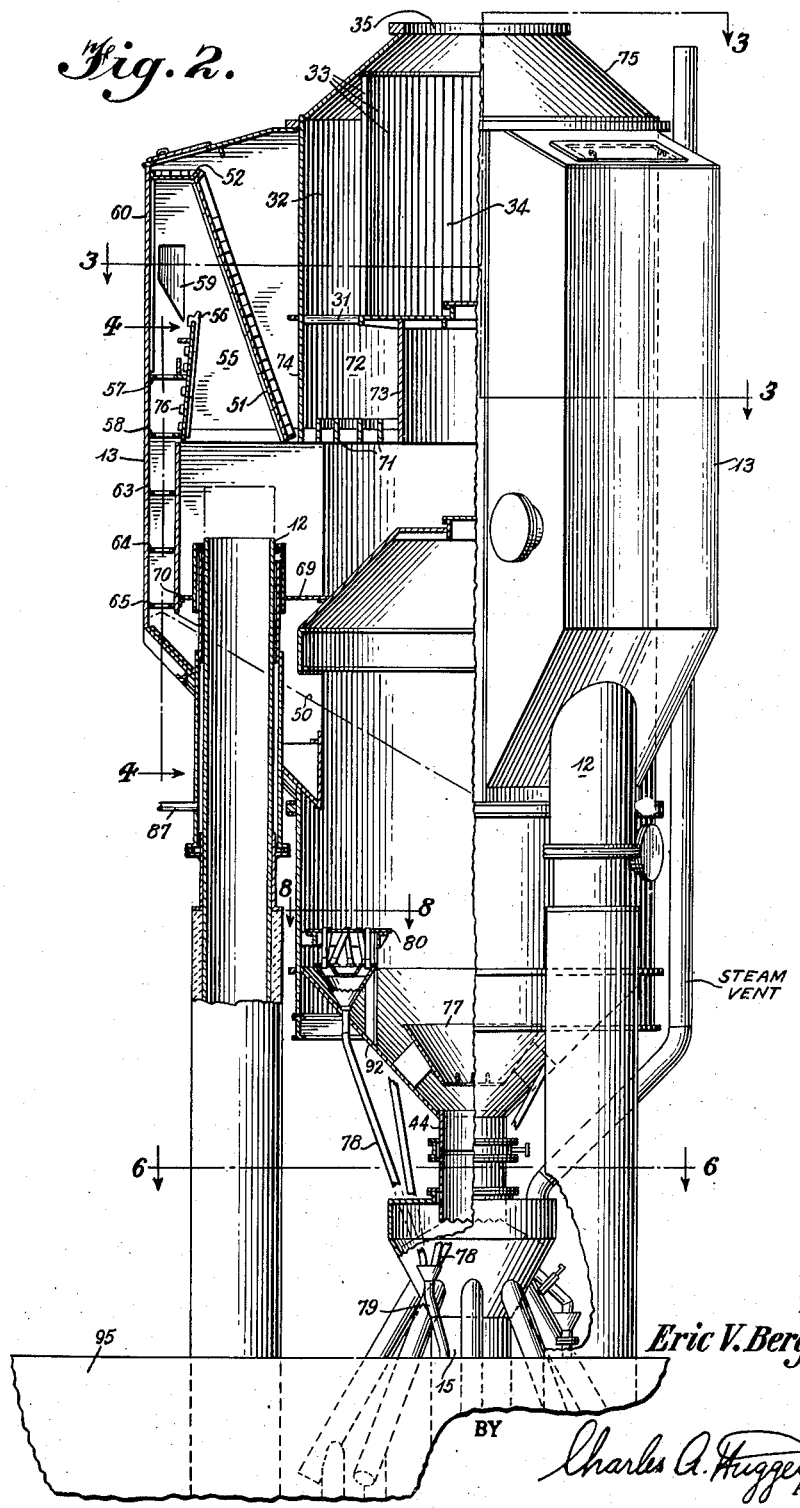
Fig. 2 is an enlarged vertical view, partly in cross-section of the catalyst separator and dust collector.

Referring now to Figures 2, 3 and 4, which show the interior of one of the separators 13, the operation of that separator will be more clearly disclosed. It will be appreciated that each of the three separators functions in a similar manner. The lift pipe 12 is terminated at an intermediate level in the separator 13 to provide space for surging, and the bed surface 50 is maintained somewhat below the upper end of the pipe 12. A deflector plate, or baffle 51, is located above the lift pipe and inclined toward the exterior wall 60 of the separator at an angle of about 70 degrees from horizontal. The deflector is somewhat wider than the diameter of the lift pipe and is supported at the top by the plate 52. A catalyst catcher 56 is inclined slightly away from the exterior wall 60 of the separator chamber and is attached thereto by horizontal plates 57 and 58. The deflector plate 51 has vertical side walls 53 on each side of the plate which extend to the exterior wall 60 of the separator chamber and prevent the particles from bounding off the plate in a lateral direction. These side walls, in combination with the deflector 51 and catalyst catcher 56, form an upwardly directed converging rectangular passageway 55 into which the granular particles and lift gases are discharged from the top of the lift pipe 12. The catalyst particles are carried above pipe 12 by the lift gas into space 55 and are deflected by baffle 51 toward the exterior wall 60 of the separator, falling behind the catalyst catcher 56, onto the surface of a bed of solids maintained on the partition plate 57. The deflector plate 51 is located far enough above the lift pipe 12 so that the upward velocity of the particles is very low at that level. The particles are, therefore, deflected readily without damage away from the vertical projection of the lift pipe and drop gently behind the catalyst catcher. If the catalyst were allowed to drop back into the lift pipe, excessive breakage would occur when the downwardly moving catalyst collides with the rising catalyst. The catalyst solids flow downwardly through the openings 61 in plate 57 onto the surface of a bed of solids maintained on partition plate 58. The plate 58 has a central opening 62 sufficiently large to permit particles to roll from the bed surface downwardly through the opening onto successively lower catalyst beds maintained on the descending plates 63, 64 and 65. These lower plates have staggered openings 66, 67 and 68 which permit the solids to descend in several stages to the catalyst surface 50 from which it rolls into the surge drum 92. The vertical distance between the successive plates 57, 58, 63, 64 and 65 is less than 5 feet and therefore the particles are not fractured in dropping downwardly onto successively lower bed surfaces.

One side of the deflector plate 51, support 52 and catcher 56, which would be badly abraded by the catalyst particles, is faced with removable metal shoes which can be readily replaced if the wear becomes excessive. Horizontal plates 76 on the opposite side of the catcher 56 provide a multiplicity of small pockets, each holding a small amount of catalyst. The deflected particles fall on the catalyst in the pockets and are hence caught on the surface of a catalyst bed. This prevents wear of the catalyst catcher 56 by the abrasive catalyst. The horizontal plates are spaced close enough together so that a line drawn from the outer edge of the plates at the angle of repose of the catalyst, about 30° with the horizontal, intersects the surface of catcher 56 at or above the level of the next higher plate, but not below. This keeps the wall shielded with catalyst.

A certain amount of lateral spreading of the stream of catalyst occurs between the top of the lift pipe and the bottom of the catalyst deflector and catcher. The lower section of the deflector passageway 55 is therefore made larger in cross-section than the top of the lift pipe to collect as much of the catalyst stream as possible. A minor amount of catalyst that is not deflected falls back upon the bar grating 69 and passes through onto the surface 50.

Most of the lift gas escapes laterally past the knock-out bars 71 into the annular region 72 beneath the dust separator, and flows upwardly between skirt baffles 73 and 74. The small amount of lift gas that does enter passageway 55 escapes through a pair of ears 59 in the side walls 53 of the catalyst catcher into the rectangular passageways 54. This gas is forced to make a complete reversal of flow being discharged from passageways 54 at a point beneath the knock-out bars 71.

Lift gas which enters space 72 is free of the larger catalyst particles but retains fines produced by the erosion of catalyst in the columns or by the impinging of catalyst against the walls of the vessels or against itself. These fines mixed with the gas do not readily settle out in the separator 13 with the mass of granular catalyst attempting to remain in suspension. It is the purpose of the dust collector 75 to remove these fines from the lift gas before liberating this gas into the atmosphere. The functioning of the dust collector 75 may be best understood by referring to Figures 2, 3 and 7.

Figure 7:
Fig. 7 is an enlarged vertical section of the inlet blades in the floor of the settling chamber as seen on plane 7—7 of Figure 3.

Referring to Figure 2, an annular chamber 32 is located above the annular passageway 72. A multiplicity of radial slots are located in the floor of the chamber, substantially equally distributed about the floor of the chamber. A multiplicity of flat inlet blades, having their axes radially-directed, are located about the floor of the chamber, one on each side of the slots. The blades are projected into the chamber in a generally tangential direction, so as to provide inlet passages between adjacent blades and cause the gas and fines passed therethrough to swirl in said chamber. The chamber 32 has a multiplicity of substantially vertical slots substantially equally distributed about the inner wall thereof. A multiplicity of flat outlet blades, having their axes located substantially vertical, are arranged one on each side of said slots. The outlet blades are projected into a receiving zone 34 in a generally tangential direction, which is similar to that of the inlet blades. Adjacent pairs of outlet blades form passages through which gas is withdrawn, substantially free of fines, into the central receiving zone 34. The opening 35 projects through the roof of the dust collector and communicates with the receiving zone, so as to provide an outlet for the gas. In place of the flat inlet and outlet blades, other baffle means could be used, such as curved baffle plates, a multiplicity of conduit elbows arranged radially about the chamber, etc. The inlet blades should be at an angle of about 10 to 20 degrees with the horizontal. The outlet blades should be at an angle of about 10 to 20 degrees with a tangent drawn to the inner wall at the location where the outlet blade contacts the wall. Figure 7 illustrates the position of the inlet blades in the floor of chamber 32.

Referring to Figure 3, the chamber is shown in horizontal cross-section. It is seen that the gas makes a substantially complete change of direction in passing through the chamber. Most of the gas is withdrawn through the outlet passages, and the remainder swirls around the chamber with the bulk of the fines. The duct 40 is attached to the wall of the vessel in a tangential direction and communicates with the interior of the chamber, so as to receive the remaining gas and entrained fines. The withdrawn gas and fines are transferred to ground level through the conduit 41. Inasmuch as the particles are still dispersed in gas, there is no danger of bridging or plugging of this long line. And yet, the downcomer does not have to be excessively large in diameter because most of the gas is withdrawn from the top of the vessel to discharge. For example, about 90 percent of the gas is normally withdrawn from the top of the vessel and about 10 percent of the gas is passed down through the downcomer with the entrained fines. The downcomer 41 connects to a separating vessel near ground level. This may be a small cyclone adapted to discharge fines-free gas and a stream of collected fines. Because of the small amount of gas handled by this separator, it can be simpler and cheaper than would otherwise be required. The fines can be collected in a bin or other suitable means.

The relation of the inlet and outlet blades 31 and 33 is illustrated in Figure 3. The complete reversal of direction of the major gas stream is indicated, in addition to the close spatial relationship of the blades. By splitting the gas stream into a multiplicity of small streams, the separation of fines from the major portion of the gas is made more effective and complete.

The Figure 5 illustrates the circumferential attachment of the shave-off duct or conduit 40. The duct is attached circumferentially to readily receive the dust laden gas with practically no change in gas direction, thereby preventing the fines from separating from this gas stream. Thus, the granular contact material and fines with lift gas is discharged from the upper end of a lift passage into a first separating zone 13 located at a high elevation, wherein the granular particles are removed for reuse in a moving bed conversion process. The gas and entrained fines are transferred to a second separating zone 75, located at about the same elevation, where most of the gas is withdrawn substantially free of fines and the rest of the gas is withdrawn containing the bulk of the fines to a third separating zone, located near ground level. The fines are removed from the gas in the third separating zone and are thereby salvaged. Apparatus which separates dust from lift gas in a similar manner is described and claimed in my co-pending application, Ser. No. 224,948, filed May 7, 1951, now Patent No. 2,717,811, September 13, 1955.

The catalyst fines which do not remain suspended in the lift gas are deflected with the larger catalyst particles and descend with them into the surge drum 92. It is recognized that when granules and fines are poured onto a bed of contact material and the bed is maintained loosely packed by continuously moving particles downward across the entire cross-section of the bed, the fines trickle downward through the voids. When the granular material is withdrawn through an outlet of restricted cross-section, covering only a minor portion of the cross-section of the bed, the contact material passing through the outlet is drawn from a conical region above the outlet which is defined by revolving an imaginary line about a vertical axis through the center of the outlet disposed in a vertical plane and directed upwardly and outwardly from the edge of the outlet at the angle of internal flow of the catalyst. The surface of the bed slopes downwardly toward the withdrawal region at the angle of repose of the catalyst, which may be about 30–45 degrees. Granules roll across the surface of the bed to the region above the outlet and are then drawn downward. The only fines passing down with the withdrawn granular material, however, are those passed onto the bed within the area of the withdrawal cone.

The continuous classification and removal of fines from the moving contact material in the surge drum is effected by providing draw-off stools and side stream outlets, the functioning of which will now be described.

Referring again to Figure 2, the main stream of catalyst is withdrawn through the conduit 44, centrally attached to the bottom of surge drum 92. The catalyst passing through the outlet would draw primarily from a conical region, the side wall of which is located at an angle of about 70–85 degrees with the horizontal. The size of the angle will depend somewhat upon the size, shape and nature of the particles. For commercially available catalyst it is usually about 75–80 degrees. This angle is known in the art as the angle of internal flow of the catalyst or contact material. The conical skirt 77 positioned above the conduit 44 increases somewhat the cross-sectional area from which catalyst is withdrawn.

However, because the catalyst is withdrawn from a restricted conical region, the surface level of the catalyst bed above the outlet 44 will drop with respect to the surface level of the rest of the bed. It is found that when the angle of the surface of the bed with respect to the horizontal becomes greater than about 30–45 degrees the granules commence to roll across the surface to the region above the outlet 44. The surface tends to remain at a substantially constant angle, known as the angle of repose of the catalyst or contact material. This angle, like that of the angle of internal flow, depends to some extent upon the size, shape and nature of the material. For commercially available catalyst it is normally about 30–35 degrees.

It is known that the fines do not roll across the surface of the bed with the granules, but tend to trickle down through the bed in a generally uniform manner. Unless the catalyst particles are kept in downward motion across the bed the voids fill with fines and then the fines move laterally to the region above the outlet 44. The bed tends to become compacted, also, and in this condition, the fines are locked in between the granules, traveling laterally with them. By withdrawing catalyst from locations distributed about the remainder of the bottom of the vessel, however, the bed can be kept loosely packed and moving downwardly across the entire horizontal cross-section. The withdrawal stools should be placed close enough together to insure withdrawal of catalyst from all portions of the bed and they are preferably uniformly distributed about the remaining cross-section of the bottom of vessel, excluding the region of the main outlet. Since the fines are uniformly distributed across the top of the bed and the main stream is drawn from only a small portion of the cross-section of the bed, the major portion of the fines is withdrawn through the side stream outlets 78. The conduits 78 are all connected to the top of the conduit 79 to combine the side streams into a single side stream.

Figure 6:
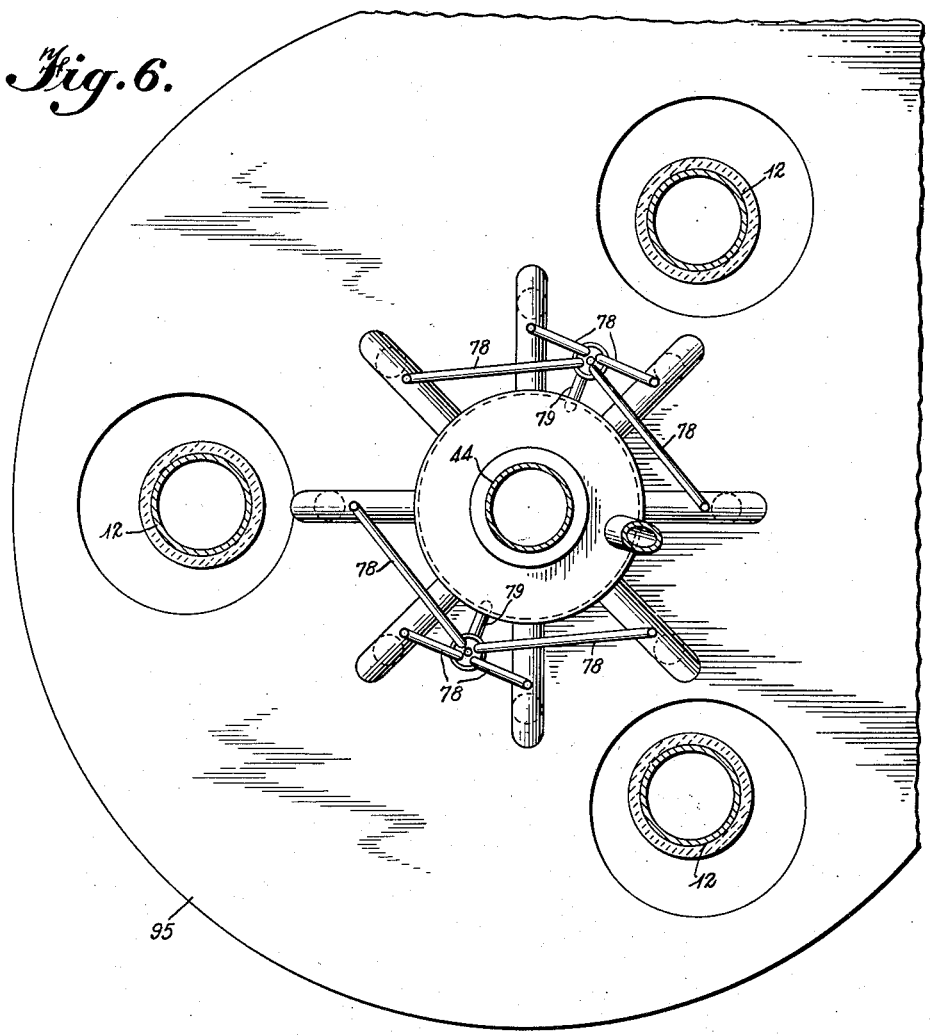
Fig. 6 is a horizontal section of the apparatus of Figure 2 as seen on plane 6—6 of Figure 2 and illustrates the distribution of the side stream outlets.

The distribution of the side stream outlets is best illustrated by Figure 6. It will be appreciated that the larger the effective cross-section of the surge drum 92 with relation to the withdrawal cone of the main stream, the larger the concentration of fines in the side stream. When the particles above the main stream outlet move downwardly at a faster rate than the particles in the rest of the vessel, the concentration of fines in the main stream is decreased and that in the side streams is increased. For effective operation the velocity of the particles above the main stream outlet should be about 5–800 times that of the particles in the rest of the vessel. The preferred range is about 200–400 times the velocity of the particles above the side stream outlets.

Referring now to Figure 1, the combined side stream 79, rich in fines, is gravitated as a substantially solid column down to an elutriator when the catalyst particles are separated from fines in a known manner.

Referring once again to Figure 6, it is shown that the side stream outlets are distributed about the bottom of the vessel. The outlets must be located close enough to effect continuous downward movement of the catalyst bed across the entire cross-section. The effective area which can be serviced by one outlet can be enlarged by using appropriately placed baffle plates or tables 80, illustrated in Figures 8 and 9. The plates or tables are located above the outlet 81 so that catalyst will roll under the plate at the angle of repose of the catalyst and cover the outlet. With reference to Figures 8, 9 and 10, catalyst is drawn about the edge of the baffle 80 from a region of triangular cross-section bounded by lines starting from the edge of the plate and directed upwardly at the angle of internal flow of the catalyst. The table, it is seen, enlarges the cross-section of the region through which the catalyst is drawn to the conduit 79. A plurality of holes 83 are located in each table to effect withdrawal of some catalyst from the region directly above the plate 80. Conduits 84 are connected beneath the holes 83 and are supported at their inlets to the annular space 81 by cover plates 85. A plurality of movable partitions 86 will slide under the conduits and may be adjusted to regulate the proportion of catalyst withdrawn through the conduits 84 to that withdrawn about the edge of the plate 80. These withdrawal stools effect downward removal of the catalyst across the entire area of the bed at a generally uniform rate, except in the region above the main stream outlet. By using properly adjusted and located tables uniform downward movement can be effected with substantially fewer withdrawal conduits than would otherwise be required.

A mechanical seal is illustrated in Figure 2 at the junction of lift pipe 12 with separator 13 which will permit movement of the lift pipe relative to the separator caused by thermal expansion and contraction. It has been found highly beneficial to introduce a gas into the annular space between the concentric pipes forming this seal. Conduit 87 supplies this gas through a mechanical seal. The stream of gas flowing through the mechanical seal into the separator 13 prevents the entry of catalyst fines between the sliding surfaces.

*Example I*

As an illustration of the invention the following data are presented from a commercial catalytic cracking system having the structure indicated generally in Figure 1. The catalyst total circulation rate is about 1100 tons per hour. Commercial synthetic bead catalyst having a size range of 4–8 mesh Tyler may be used. Three 297 ft.

lift pipes tapered outwardly from bottom to top and having an average internal diameter of about 32" were employed to elevate the catalyst.

Individual separators were located at the top of each lift pipe as illustrated in Figures 2 and 3. These separators possess the following dimensions:

| | |
|---|---|
| Height of exterior wall (detail 60 on Fig. 2) | 22 ft. |
| Width of separator (distance between inside faces of the exterior wall 60 and wall 74 on Figure 2) | 7 ft. 3⅜ in. |
| Distance from the bottom of the deflector to the top of the lift pipe (cold) | 4 ft. 2¹/₁₆ in. |
| Angle of inclination of the deflector from the horizontal | 70° 40'. |
| Distance from the top of the lift pipe to the top of the catalyst catcher (detail 56 on Figure 2) | 10 ft. 3⅜ in. |

The shape of the surge drum was similar to that illustrated in Figures 2 and 3 and possessed the following dimensions:

| | |
|---|---|
| Inside diameter of surge drum | 17 ft. |
| Maximum inside diameter of conical baffle (detail 77 on Figure 2) | 6 ft. 1⅛". |
| Inside diameter of main outlet (detail 44 on Figure 2) | 34 in. |
| Inside diameter of side stream withdrawal conduits (separator surge fines line detail 78 on Figure 2) | 4 in. |
| Number of side stream withdrawal conduits | 8. |
| Diameter of tables (fines draw off stools detail 80 on Figure 9) | 4 ft. |
| Diameter of table drop pipes (fines draw off pipes detail 84 on Figure 9) | 3 in. |
| Height of table above main outlet | 8 ft. 8⅝". |

A dust collector, similar to the one shown on Figures 2 and 3, was designed for a catalyst circulation rate of 1100 tons per hour. The following are the pertinent dimensions of the separating vessel and related apparatus:

| | |
|---|---|
| Inside diameter of vessel | 17 ft. |
| Inside diameter of skirt baffle (detail 73 on Figure 2) | 7 ft. 6 in. |
| Height of skirt baffle | 6 ft. |
| Vertical distance from the skirt baffle to top of lift pipe | 4 ft. 2¹/₁₆". |
| Horizontal width of annular passageway between skirt baffle and vertical wall of vessel | 4 ft. 9 in. |
| Number of inlet blades | 128. |
| Circumferential spacing between inlet blades at outside edge of blades | 5 in. |
| Pitch of inlet blades relative to horizontal | 11° 30'. |
| Width of inlet blades | 6 in. |
| Thickness of inlet blades | ⅜ in. |
| Number of outlet blades | 128. |
| Height of outlet blades | 11 ft. 6 in. |
| Height of shave-off aperture (detail 40 on Figure 5) | 8 ft. 11¼ in. |
| Width of shave-off aperture | 2 ft. 6⅝ in. |
| Diameter of downcomer from shave-off apparatus to secondary cyclone near ground level | 20 in. |

The specific example is given only as an illustration of the invention, and is not considered as limiting the range of the invention. It is intended that the scope of this invention be considered broadly to cover all changes and modification of the examples of the invention herein chosen for purposes of the disclosure, which do not constitute departures from the spirit of the invention.

It is an advantage of the apparatus of my invention that the deflector is readily available for repair. This greatly simplifies the replacement of the shoes when abrasion makes that necessary.

Another advantage of the apparatus of my invention is the particular arrangement of the separators with respect to the common surge bin. This insures a continuous flow of catalyst into the surge bin from several directions. The uniform slope from the floor of each separator to the center of the surge bin results in a more uniformly level catalyst bed in the surge bin.

What is claimed is:

1. In a hydrocarbon conversion system in which a reactor is positioned above and in vertical alignment with a regenerator, and a catalyst surge bin is positioned above and in vertical alignment with the reactor, said surge bin reactor and regenerator being connected in series; improved apparatus for transferring in a continuous cyclic path catalyst from a location beneath the regenerator to a location above the surge bin which comprises: a plurality of lift pipes circumferentially positioned and adjacent to the regenerator and reactor, individual catalyst separators adjacent the exterior wall of the surge bin and positioned at the upper end of said lift pipes, deflector plates positioned within said separators to deflect catalyst emerging from the lift pipes outwardly away from the center of the surge bin and means to return the deflected catalyst from the individual separators to the centrally located surge bin.

2. In a hydrocarbon conversion system in which a reactor is positioned above and in vertical alignment with a regenerator and a catalyst surge bin is positioned above and in vertical alignment with the reactor, said surge bin reactor and regenerator being connected in series; improved apparatus for transferring in a continuous cyclic path catalyst from a location beneath the regenerator to a location above the surge bin which comprises: a plurality of lift pipes circumferentially positioned and adjacent to said regenerator and reactor, individual catalyst separators adjacent the exterior wall of the surge bin and positioned at the upper ends of said lift pipes, deflector plates positioned within said separators and inclined at an angle away from the center of the surge bin, a catalyst catcher positioned opposite said deflector plate and a series of descending plates having openings therein through which the deflected catalyst can pass into the central surge bin.

3. In a hydrocarbon conversion system in which a reactor is positioned above and in vertical alignment with a regenerator and a catalyst surge bin is positioned above and in vertical alignment with the reactor, said surge bin reactor and regenerator being connected in series, improved apparatus for transferring in a continuous cyclic path catalyst from a location beneath the regenerator to a location above the surge bin which comprise three lift pipes circumferentially positioned around said regenerator and reactor and separated by 120° of arc, three catalyst separators adjacent the exterior wall of the surge bin and positioned at the upper ends of the lift pipe, a dust separator located above the surge bin through which the lift gases escape to the atmosphere, deflector plates positioned within each of said separators to deflect the catalyst emerging from the lift pipe outwardly away from the center of the surge bin and means to return deflected catalyst from each of the three separators to the centrally located surge bin.

References Cited in the file of this patent

UNITED STATES PATENTS

| | | |
|---|---|---|
| 2,656,920 | Kollgaard | Oct. 27, 1953 |
| 2,674,498 | Thayer | Apr. 6, 1954 |
| 2,684,270 | McClure | July 20, 1954 |
| 2,684,930 | Berg | July 27, 1954 |